UNITED STATES PATENT OFFICE.

CHARLES CARROLL GILMAN AND GEORGE EARL GILMAN, OF ELDORA, IOWA.

FIREPROOFING BUILDING MATERIALS.

SPECIFICATION forming part of Letters Patent No. 560,580, dated May 19, 1896.

Application filed April 12, 1893. Serial No. 470,106. (No specimens.)

*To all whom it may concern:*

Be it known that we, CHARLES CARROLL GILMAN and GEORGE EARL GILMAN, of Eldora, county of Hardin, State of Iowa, have invented certain new and useful Improvements in Fireproof Building Materials and Processes of Producing the Same, of which the following is a specification.

The object of our invention is to produce an improved building material which possesses positive fire-extinguishing properties.

Our invention consists in the process of producing such material and in the article of manufacture produced by the process.

In preparing the material according to our process it is necessary to select as a base a porous body—such, for example, as wood; but inasmuch as our invention consists in storing an extinguishing agent, which shall remain inactive until it is needed, any suitable porous body may be substituted for the wood.

In carrying out our process the following steps are pursued: We first prepare in a suitable receptacle (preferably an iron vat or pan mounted above a fire-box and supplied with a temporary cover to prevent too free evaporation) an equal mixture, by weight, of pure soft water and sal-ammoniac. We mention sal-ammoniac as a preferable example of fire-extinguishing material that may be used for this purpose; but we do not wish to limit ourselves to the employment, exclusively, of that material. Next we dissolve the salt in the water by raising the temperature thereof to about 200° Fahrenheit, at about which temperature the mixture should be maintained. Into the heated mixture the material to be treated is submerged. The time required for the submersion is of course different with different materials, the object being to impregnate the pores of the material to a considerable depth. Woods of different fineness of grain will require longer or shorter periods of submersion, the time for white pine being from about thirty to sixty hours, depending on thickness. The solution of sal-ammoniac must be kept in about the original proportions, which when a change occurs by evaporation may be compensated for by a fresh supply of water. As the mixture is absorbed by the material its bulk may be increased by an additional quantity of the mixture. When the saturation of the material has been satisfactorily effected, it is withdrawn and is next passed rapidly through a bath of cool soft water, the cleansing process being aided by rubbing with stiff brushes until all adhering incrustations are removed. Immediately following this step of the process the material is next subjected to a bath of hot strong soapsuds, the temperature of which should be maintained at about the same degree. This process should also be performed rapidly. The solution is preferably made of soft soap and is of almost ropy consistency. The material is next passed through a bath of hot alum-water at about a temperature of 150° Fahrenheit. The mixture may be composed in the proportions of about one gallon of water to a pound of alum. After the treatment in the alum-bath the material is preferably artificially dried in a temperature which should not exceed 200° Fahrenheit. It may be dried in the atmosphere, care being taken to protect it from exposure to the weather.

It should be understood that the submersion of the material in the sal-ammoniac solution is to impregnate its pores with a substance which being under ordinary conditions permanent in its nature will, under heat, give off a fire-extinguishing gas. Sal-ammoniac, the suggested material for this purpose, is soluble in water, and it is necessary that it should be perfectly protected with the incasing pores of the material that has absorbed it. The treatment, therefore, to the water-bath is to superficially cleanse the pores and prepare them to retain the waterproofing effects of the soap and alum baths.

When the final steps of the process have been completed, a building material suitable for usual ornamentation will have been prepared that will keep stored up within its pores out of reach of the injurious effects of moisture a fire-extinguishing agent that will be called into action as soon as the temperature of the surrounding atmosphere is raised sufficiently to volatilize the extinguishing agent.

What we claim is—

1. The process of producing a fire-extinguishing building material, which consists in saturating a porous body with a volatilizable fire-extinguishing agent and protecting said agent with a coating of soap and alum, substantially as specified.

2. The process of producing a fire-extinguishing building material, which consists in saturating a porous body with a solution of sal-ammoniac, next superficially cleansing the pores thereof, then subjecting it to a bath of hot soapsuds, and finally to a solution of alum, substantially as and for the purpose specified.

In testimony that we claim the foregoing as our invention we have signed our names, in presence of two witnesses, this 30th day of March, 1893.

CHARLES CARROLL GILMAN.
GEORGE EARL GILMAN.

Witnesses:
FANNIE W. WISNER,
CHAS. HEITSHU.